United States Patent
Riley et al.

(10) Patent No.: US 7,136,652 B2
(45) Date of Patent: *Nov. 14, 2006

(54) SYSTEM AND METHOD FOR IDENTIFICATION OF TRANSMITTERS WITH LIMITED INFORMATION

(75) Inventors: Wyatt Riley, Fremont, CA (US); Grant Marshall, Campbell, CA (US)

(73) Assignee: Qualcomm Incorporated, San Diego, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 10/921,690

(22) Filed: Aug. 18, 2004

(65) Prior Publication Data

US 2005/0124374 A1    Jun. 9, 2005

Related U.S. Application Data

(62) Division of application No. 10/014,316, filed on Dec. 11, 2001, now Pat. No. 6,832,090.

(60) Provisional application No. 60/318,661, filed on Sep. 10, 2001.

(51) Int. Cl.
*H04Q 7/20* (2006.01)

(52) U.S. Cl. ............... 455/446; 455/525; 455/69; 455/457; 455/447; 455/526; 455/480; 455/502

(58) Field of Classification Search ............... 455/446, 455/525, 69, 60, 502, 335, 457, 524, 526, 455/343.3, 447, 448, 480
See application file for complete search history.

(56) References Cited

U.S. PATENT DOCUMENTS 6,832,090 B1 *  12/2004  Riley et al. ............ 455/446

* cited by examiner

*Primary Examiner*—Edan Orgad
(74) *Attorney, Agent, or Firm*—Philip Wadsworth; Bruce Greenhaus; Andrea Mays

(57) ABSTRACT

A system and method are disclosed by which a base transceiver station (BTS) may be uniquely identified. When attempting to determine the location of a mobile unit using signal from multiple BTSs, it is critical that the BTSs be uniquely identified and their position accurately determined. In many cases, the signals received from the BTSs provide limited identification information and cannot be used to uniquely to identify the BTS from which a signal has been received. The present invention uses available information to generate a candidate list and to determine therefrom the most likely candidates for the Measurement BTSs. Based on this information, the system analyzes cell coverage overlap and relative phase delay to determine the likelihood of a candidate BTS being the actual BTS from which a signal is received. As candidate BTSs are uniquely identified, it is possible to use this additional identification information in an iterative process to further identify additional candidate BTSs.

19 Claims, 6 Drawing Sheets

SYSTEM AND METHOD FOR IDENTIFICATION OF TRANSMITTERS WITH LIMITED INFORMATION

RELATED APPLICATIONS

This application is a divisional of U.S. application Ser. No. 10/014,316, filed Dec. 11, 2001, now U.S. Pat. No. 6,832,090 which claims priority to U.S. Provisional Application No. 60/318,661, filed on Sep. 10, 2001.

BACKGROUND OF THE INVENTION

1. Field of the Invention

The present invention is directed generally to transmitter identification and, more particularly, to a system and method for the identification of transmitters using limited information.

2. Description of the Related Art

Existing position location technologies based on global positioning system (GPS) use a network of satellites in the sky which transmit signals at a known time. A GPS receiver on the ground measures the time of arrival (TOA) of the signals from each satellite it can detect. The TOA of the signals from the satellites, along with the exact position of the satellites and the exact time the signal was transmitted from each satellite is used to triangulate the location of the GPS receiver. A typical GPS receiver requires four satellites to make a triangulation, and the performance of the resulting calculation increases as the number of satellites that can be detected increases.

In an alternative to, or augmentation of, GPS, an existing network of cellular base stations can be treated as a network of satellites for purposes of location determination. Similar to GPS technology, the exact position of each base station, the exact time at which the base station is transmitting a signal, and the TOA of the base station signals at a mobile unit can be used to triangulate the location of the mobile unit. This technique is described by some service providers as Advanced Forward Link Trilateration (AFLT). Wireless networks may also be used in conjunction with GPS to determine the location of the mobile unit.

A significant problem faced by the mobile station is to measure the TOA of the signals that are received from each base station. Different wireless technologies may take different approaches to TOA measurements. Code division multiple access (CDMA) is one such technology. CDMA modulation is one of several techniques that allow a large number of system users to share a communication system. It is possible to utilize measurements of conventional CDMA modulation techniques to determine the location of a mobile unit using AFLT techniques.

CDMA modulation techniques are disclosed in U.S. Pat. No. 4,901,307, issued on Feb. 13, 1990, entitled "SPREAD SPECTRUM MULTIPLE ACCESS COMMUNICATION SYSTEM USING SATELLITE OR TERRESTRIAL REPEATERS," which is assigned to the assignee of the present invention, and the disclosure of which is incorporated herein by reference. The above-referenced patent discloses the use of a phase-coherent and chip-synchronous chip sequence that is defined as a pilot chip sequence, or pilot signal. The pilot signal can be used to provide phase and time acquisition and tracking, and multi-path correction.

Methods for acquiring the pilot signals are disclosed in the above-referenced patent and in the following patents: (1) U.S. Pat. No. 5,781,543, issued on Jul. 14, 1998 and entitled "POWER-EFFICIENT ACQUISITION OF A CDMA PILOT SIGNAL;" and (2) U.S. Pat. No. 5,805,648, issued on Sep. 8, 1998 and entitled "METHOD AND APPARATUS FOR PERFORMING SEARCH ACQUISITION IN A CDMA COMMUNICATION SYSTEM," both of which are assigned to the assignee of the present invention and the disclosures thereof are incorporated herein by reference.

When the mobile unit is first powered on, it must establish a communication link with a base transceiver station (BTS). The mobile unit will typically receive pilot signals from a plurality of BTSs. The mobile unit will search for the signals from the BTSs and will establish a communication link with a selected BTS to permit the reception and transmission of data, such as audio signals, over the established communication link. The selection of a particular BTS and the actual process of communication between the mobile unit and the selected BTS are well known in the art and need not be discussed in detail herein.

As discussed in the above-referenced patents, each BTS periodically broadcasts the same pseudo-noise (PN) code pilot signal, but with a different time offset. That is, each BTS transmits the same PN code, but the start of transmission of the PN code from the transmitter in each BTS is delayed in time by a precisely known offset. The time offsets are measured in multiples of 64 chips. As those skilled in the art will appreciate, a "chip" is a single piece of data in the PN sequence. Because the data is transmitted at a known rate, chips may be used as a measure of time. Although the present description may be characterized in actual units of time, it is more convenient to refer to the time in terms of chips or portions of chips because the TOA delays due to the PN offset as well as propagation delay measurements may be calculated in terms of chips.

To acquire the pilot signal, the mobile unit must synchronize with the time offset and frequency of the signal transmitted by a BTS. The object of a "searcher" process in the wireless device is to find the time offset of the received signal. The searcher uses an estimated frequency. If the estimated frequency is not sufficiently close to the frequency of the pilot signal, the received signal will not be acquired.

When a BTS is properly detected, the output of the searcher is a pulse, which may be considered a correlation pulse. This correlation pulse may be used to measure the TOA of the signal from the BTS. It is necessary to measure the TOA from a number of BTSs to accurately determine the location of the mobile unit. In a typical embodiment, the TOA from at least four BTSs must be calculated to determine the location of the mobile unit. A more accurate determination may be made if TOA signals are received from additional BTSs.

An accurate determination of the location of the mobile unit requires precise identification of each BTS from which a signal is received as well as the precise time at which signals were transmitted from each BTS. However, the mobile unit is often unable to precisely identify the BTS because only limited information is received from the BTS. That is, the mobile unit does not always receive complete information from each BTS that permit the unique identification of each BTS. In a particular geographic region, multiple BTSs may have the same PN offset resulting in potential ambiguity as to the identification of a BTS from which a signal has been received. Such ambiguity leads to inaccuracies in the location determination process. Therefore, it can be appreciated that there is a significant need for a technique by which transmitters may be identified using the limited information received by a mobile unit. The present invention provides this and other advantages as will be apparent from the following detailed description and accompanying figures.

BRIEF SUMMARY OF THE INVENTION

In an exemplary embodiment, the inventive method comprises receiving transmission from a plurality of base stations wherein the transmissions include complete identification data from a first base station and only partial identification data insufficient to identify at least a portion of the plurality of base stations. A candidate list is generated to provide an identification of candidate base stations from which transmissions containing only partial identification data may have been received. Candidate base stations are analyzed with respect to base stations that have been uniquely identified and the identity of base stations determined on a basis of the analysis of the candidate base stations. The analysis may include an analysis of areas of coverage overlap between a known coverage area of the uniquely identified base station(s) and a coverage area of the selected one of the candidate base stations. Additional analysis of a relative phase delay between one or more uniquely identified base station and a selected candidate base station may also be performed.

BRIEF DESCRIPTION OF THE SEVERAL VIEWS OF THE DRAWING(S)

DETAILED DESCRIPTION OF THE PREFERRED EMBODIMENTS

The present invention uses a data analysis technique to identify transmitters from which signals are being received. The location of a wireless unit is based on a time of arrival (TOA) of the signal transmitted from a plurality of identified base transceiver stations (BTSs). The delay in the TOA is based on the PN offset as well as the transmission propagation delay. The TOA offset may be readily determined. However, the propagation delay requires the unique identification of each BTS so that the position of each BTS is precisely known.

In most cases, the only information available to the mobile unit is the PN offset. As is known in the art, the PN offset is typically in multiples of 64 chips. However, some service providers use separation of more than 64 chips in PN offsets. Given the length of the PN code in the pilot signal, there are only 512 (0–511) possible PN offsets for a system using 64-chip PN offset separation. As will be described below, this leads to significant ambiguities in uniquely identifying a BTS.

Figure 1:
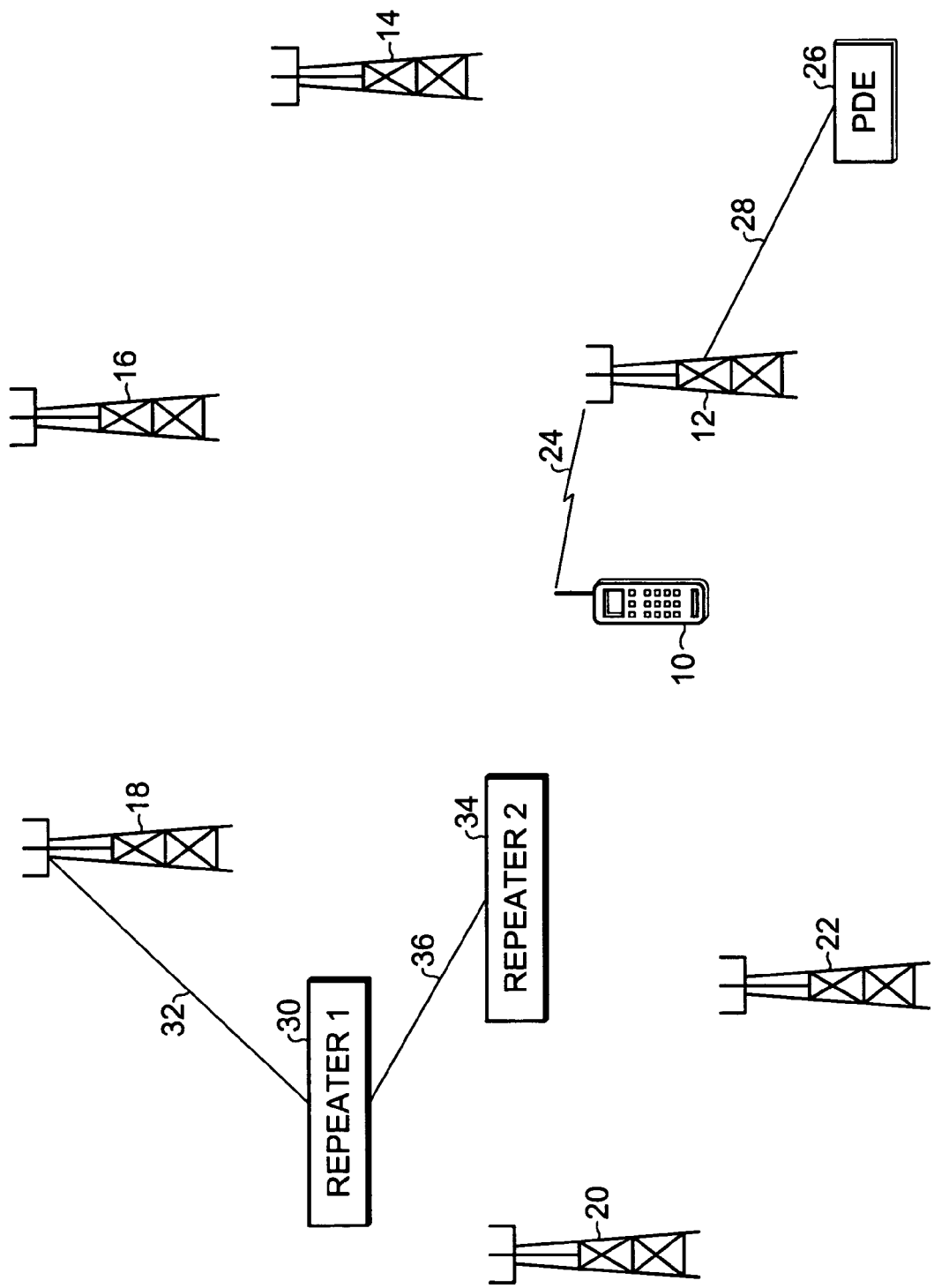
FIG. 1 is a diagram illustrating the relative position of a mobile unit with respect to multiple base transceiver stations (BTSs).
Figure 2:
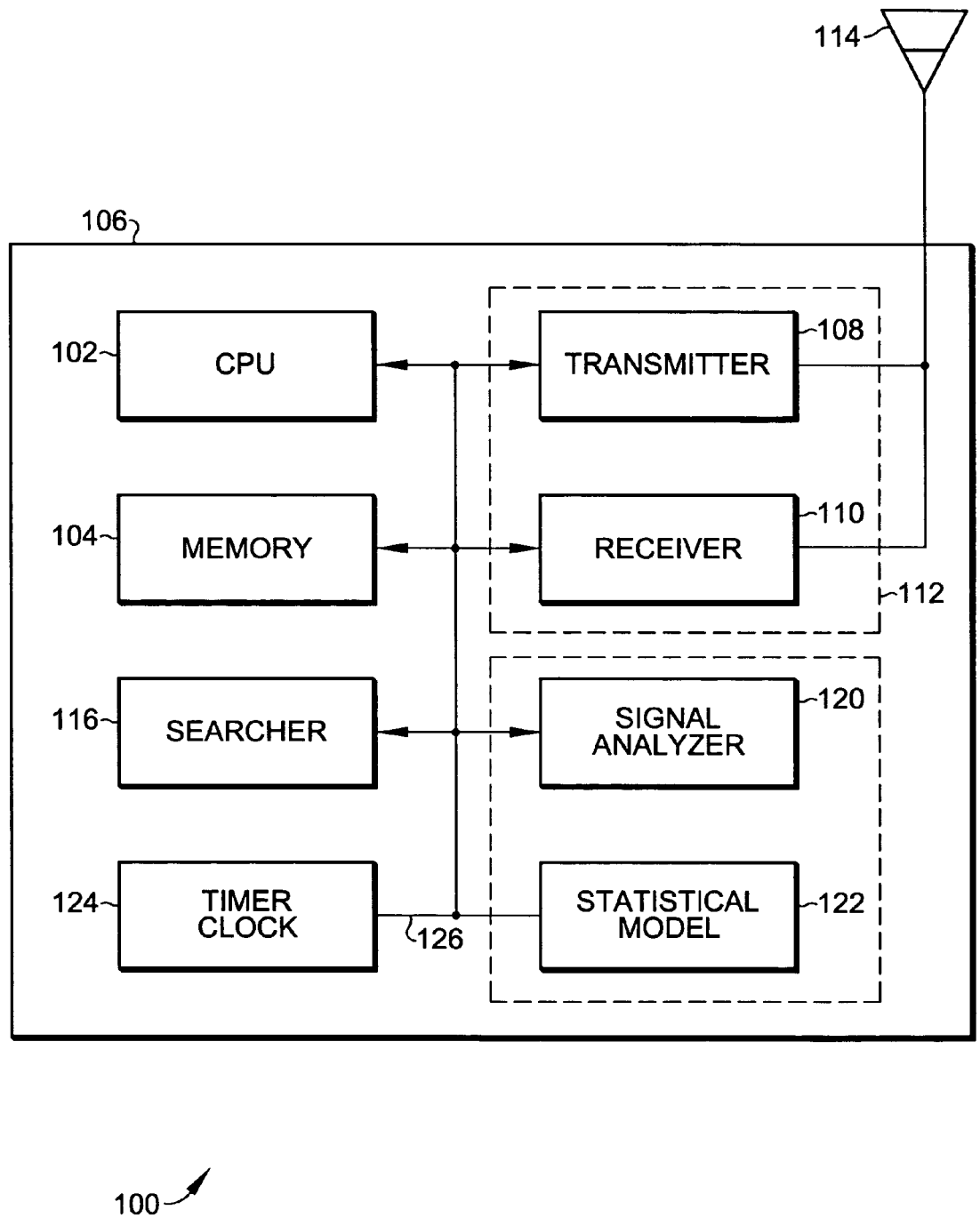
FIG. 2 is a functional block diagram of a wireless communication device implementing the system of the present invention.

FIG. 1 is a diagram illustrating the operation of a wireless system using advanced forward link trilateration (AFLT) to determine the location of the mobile unit. As illustrated in FIG. 1, a mobile unit 10 is within range of a plurality of BTSs 12–22. To permit normal communication, such as voice communication, the mobile unit 10 establishes communication links with one or more of the BTSs 12–22, respectively. The information derived in the process of establishing the communication links may be used to estimate the TOA and thereby determine the location of the mobile unit 10 with respect to the BTSs 12–22. In FIG. 2, a communication link 24 is established between the mobile unit 10 and the BTS 12. It should be noted that it is not necessary to establish a communication link with a BTS to measure its TOA. The mobile unit 10 can actually measure the TOA simply by listening to all the base stations. However, accurate location determination requires the identification of each BTS so that the TOA delay based on propagation delays may be used in the AFLT process. The present invention provides a technique for uniquely identifying BTS based on the limited information available to the mobile unit 10.

In a communication system, signals from a BTS are often propagated beyond their normal coverage area by the use of repeaters. A repeater receives the signal from the BTS and retransmits the same signal. FIG. 1 illustrates a repeater 30 coupled to the BTS 18 via a communication link 32. The communication link 32 may be a wireless communication link, a fiber optic, hardwire, or other known signal communication link. A BTS which has a repeater (e.g., the BTS 18) is known as a donor BTS because it "donates" its signal to the repeater. FIG. 1 also illustrates a repeater 34 coupled to the repeater 30 via a communication link 36. As discussed above with respect to the communication link 32, the communication link 36 may be a wireless communication link, fiber optic, hardwire, or the like. Use of the repeaters 30 and 34 effectively extend the range of the BTS 18. A mobile unit, such as the mobile unit 10, which measures a signal from a donor BTS may be receiving that signal directly from the BTS or it may be receiving the signal via the repeater. Frequently it is not easily possible for the mobile unit 10 to determine whether the measured signal has come through the repeater or not.

The present invention is embodied in a system 100 illustrated in the functional block diagram of FIG. 2. The system 100 includes a central processing unit (CPU) 102, which controls operation of the system. Those skilled in the art will appreciate that the CPU 102 is intended to encompass any processing device capable of operating the telecommunication system. This includes microprocessors, embedded controllers, application specific integrated circuits (ASICs), digital signal processors (DSPs), state machines, dedicated discrete hardware, and the like. The present invention is not limited by the specific hardware component selected to implement the CPU 102.

The system also preferably includes a memory 104, which may include both read-only memory (ROM) and random access memory (RAM). The memory 104 provides instructions and data to the CPU 102. A portion of the memory 104 may also include non-volatile random access memory (NVRAM).

In one embodiment, the location of the mobile unit 10 may be determined solely by processing that occurs within the mobile unit itself. In an alternative embodiment, the mobile unit will transmit data that it receives to a BTS (e.g., the BTS 12) to permit the position calculation to be determined by the BTS. In yet another alternative embodiment, the mobile unit transmits data to the BTS (e.g., the BTS 12) which in turn transmits the data to a position determining entity (PDE) 26. FIG. 1 illustrates the PDE 26 as coupled to the BTS 12 via a communication link 28. The communication link 28 may be a landline or another wireless connection. In addition, the PDE 26 may be coupled to a large number of BTSs (e.g., the BTSs 12–22) and may receive data relating to the present invention from any one of the BTSs. The advantage of a centrally located positioning determining entity, such as the PDE 26, is that statistical analysis, base station lookup, and other processes, which will be described in detail below, may be more efficiently done by a centrally located unit rather than processed by the mobile unit 10. It can be appreciated that the quantity of information required regarding the location of all BTSs can be more efficiently stored in a centralized PDE rather than provide for increased storage requirements for the mobile unit 10. However, the present invention is not limited by the specific location at which the position of the mobile unit 10 is determined.

In one embodiment, the system 100 is implemented in a wireless communication device such as a cellular telephone, also includes a housing 106 that contains a transmitter 108 and a receiver 110 to allow transmission and reception of data, such as audio communications, between the system 100 and a remote location, such as a BTS (e.g., the BTS 12 of FIG. 1). The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein except as it relates specifically to the present invention.

In an implementation for a CDMA device, the system also includes a searcher 116 to detect and quantify the level of signals received by the receiver 110. The searcher 116 detects one or more parameters, such as a total energy, pilot energy per pseudo noise (PN) chip, power spectral density, and other parameters, as is known in the art. The searcher 116 performs a correlation analysis to determine time of arrival (TOA) from a location, such as the BTS 12 (see FIG. 1).

The searcher 116 performs a correlation analysis between a reference signal and a received signal and generates a correlation output signal. A number of different measures, such as total energy, pilot energy per PN chip or power spectral density, may be used as the correlation value. One commonly used measure is simply the received signal strength such as may be indicated by the received signal strength index (RSSI).

A signal analyzer or modeling processor 120 analyzes the correlation signals and uses a statistical model 122 to uniquely identify the BTSs whose signals are received by the mobile unit 10. As discussed above, the position of the mobile unit may be determined by processing within the mobile unit itself or by an external entity, which is illustrated generically in FIG. 1 as the PDE 26. The signal analyzer 120 and statistical model 122 may not be required in the mobile unit 10 if the position is determined by an external entity, such as the PDE 26. For position determination by the PDE 26, the signal analyzer 120 and the statistical model 122 may be located within the PDE 26 and remote from the mobile unit 10, as illustrated by the dashed lines in FIG. 2. The operation of the signal analyzer 120 and statistical model 122 are described in greater detail below. The system 100 includes a timer 124 to provide system timing that is used to measure delay times in the arrival of signals from different sources (e.g., the BTSs 12–22 and one or more GPS satellites). The timer 124 may be a stand-alone device or part of the CPU 102.

The various components of the system 100 are coupled together by a bus system 126, which may include a power bus, a control signal bus, and a status signal bus in addition to a data bus. However, for the sake of clarity, the various buses are illustrated in FIG. 2 as the bus system 126.

One skilled in the art will appreciate that the system 100 illustrated in FIG. 2 is a functional block diagram rather than a listing of specific components. For example, although the searcher 116 and signal analyzer 120 are illustrated as two separate blocks within the system 100, they may be in fact embodied in one physical component, such as a digital signal processor (DSP). They may also reside as program codes in the memory 104, such code being operated on by the CPU 102 or a processor (not shown) in the PDE 26 (see FIG. 1). The same considerations may apply to other components listed in the system 100 of FIG. 2, such as the statistical model 122.

Operation of the components shown in the system 100 of FIG. 2 will be explained in detail. To assist in proper understanding of the present invention, a brief description of TOA processing using, by way of example, a CDMA mobile unit, will be presented. A mobile unit (e.g., the mobile unit 10 in FIG. 1) implementing the system 100 of FIG. 2 is initially assigned a pseudo noise (PN) code. The PN code may be stored in the memory 104 as a local reference. When a base station (e.g., the BTS 12) transmits data to the mobile unit 10, the base station transmits the PN code. The system 100 continuously searches for a correlation between the local reference (i.e., the stored PN code) and transmitted data (i.e., the transmitted PN code).

The PN offsets are selectively assigned to BTS transmitters so that the offsets in a geographic region are spread out as much as possible to avoid interference between transmitters. The transmitters (e.g., the transmitters in the BTSs 12–22) may be identified by transmitted identification data, but are sometimes labeled only by their PN offset time. For example, the transmitter in BTS 12 may be identified as PN 4 to indicate that it transmits the PN code at an offset of 4×64 chips. In the present example, the transmitters 14 and 16 may be identified as PN 12 (i.e., 12×64 chips) and PN 25 (i.e., 25×64 chips), respectively, to indicate the offset times at which each will transmit the PN code.

It should be understood, however, that regardless of how the BTS transmitters are labeled, the relative offset of each with respect to each other can be established from the information encoded in the signals. The receiver 110 (see FIG. 2) in the mobile unit 10 will detect the PN offset from each of the transmitters in the geographic area (e.g., the transmitters in the BTSs 12–22).

When the PN code is transmitted from a BTS (e.g., the BTS 12) there may be a delay due to the PN offset assigned to each transmitter. In addition, there is a propagation delay that is indicative of the distance between the transmitter and the mobile unit 10. It is this propagation delay that can be measured by the system 100 to determine the location of the mobile unit 10. For example, the correlation pulse from the BTS with the lowest PN offset will arrive at the mobile unit 10 prior to arrival of signals from any other BTS. The system 100 must accurately determine the TOA of this first signal and may arbitrarily assign it to a time offset of zero. Subsequent correlation pulses from other BTSs and/or GPS satellites (not shown) will also be detected by the mobile unit 10, but with additional delays that are the result of the PN offset and the propagation delay. The delay associated with the PN offset is precisely known. Thus, a residual delay is propagation delay as a result of the distance between the BTS and the mobile unit 10.

As one skilled in the art can appreciate, propagation delays can only be used to determine MS position if each BTS is uniquely identified. However, most information received from the BTSs simply indicate the PN offset. Because there are a limited number of possible PN offsets, the mobile unit 10 cannot always uniquely identify the particular BTS. For example, assume the mobile unit 10 only receives an offset value that identifies a particular BTS as PN 25 (i.e., 25×64 chip offset). There may be thousands of BTSs within the country that have an identical offset. Thus, it is not possible to uniquely identify a particular BTS based only on this information.

The system 100 utilizes this limited information and generates additional information to establish a list of possible candidates and select the most likely candidates. As will be discussed in greater detail below, the system 100 then analyzes the list of likely candidates using a variety of techniques to uniquely identify a particular BTS.

The mobile unit 10 does have additional information derived from at least one BTS. Returning momentarily to FIG. 1, the mobile unit 10 initially establishes a communication link with a selected BTS. As previously noted, the process of selecting one BTS with which to communicate is known in the art and need not be described herein. However, the primary BTS with which the mobile unit 10 communicates is referred to in the industry as the "Serving" BTS. In the example of FIG. 1, the mobile unit 10 establishes the communication link 24 with the BTS 12. In this example, the BTS 12 would be considered the Serving BTS. In establishing the communication link 24, the mobile unit 10 receives data that uniquely identifies the BTS 12.

Under telecommunication standard TIA-801 (Position Determination) and TIA-801-1 (Position Determination) (hereinafter TIA-801), the Serving BTS (e.g., the BTS 12 of FIG. 1) provides a number of parameters including NID, SID, BAND_CLASS, CDMA_FREQ, and BASE_ID. As those skilled in the art will recognize, NID refers to network identification, SID refers to system identification, BAND_CLASS refers to a set of channels allocated to that communication system as well as a number scheme for that communication system, CDMA_FREQ refers to the operational frequency on which the BTS and MS are communicating, and the BASE_ID identifies the particular BTS (e.g., the BTS 12 in FIG. 1) and includes a sector identification. This information can uniquely identify the BTS. With this information, the precise position (i.e., latitude and longitude) of the Serving BTS can be determined.

As those skilled in the art will appreciate, a typical BTS actually comprises independent transmitter receiver pairs that control a sector. Each sector is essentially an independent BTS. Thus, the sector identification provided under TIA-801 uniquely identifies the Serving BTS (e.g., BTS 12 of FIG. 1) and the particular sector of the Serving BTS with which the communication link 24 has been established.

Another telecommunications industry standard, J-STD-036(E)911 (Phase 2), J-STD-036(E)911 (Phase 2-Addendum 1) (hereinafter J-STD-036), provides information regarding the Serving BTS, including Market ID, Switch Number, Band Class, CDMA Freq., and Cell ID. The Market ID in the telecommunication standard J-STD-036 is typically the same as the system identification in TIA-801 while the Cell ID in J-STD-036 is typically the same as the BASE_ID in TIA-801. Thus, under telecommunication standard J-STD-036, the mobile unit 10 receives sufficient information to uniquely identify the Serving BTS.

Given this minimal information, the system 100 can uniquely identify other BTSs from which signals are received. For purposes of the present invention, the location of the mobile unit 10 is determined by measuring TOA from a "Reference" BTS and three or more "Measurement" BTSs. In most cases, the Reference BTS will be the same as the Serving BTS unless a hand-off has occurred. However, for the sake of simplicity and understanding the present invention, the Serving BTS will be considered the same as the Reference BTS. In the example of FIG. 1, the Serving/Reference BTS is the BTS 12. The BTSs 14–22 are considered Measurement BTSs for purposes of the present invention.

As discussed above, the mobile unit 10 has sufficient data to unique identify the BTS 12. However, signals from the Measurement BTSs (e.g., the BTSs 14–22) typically only include the PN offset, BAND_CLASS, and CDMA_FREQ (under the telecommunication standard TIA-801).

Prior to the receipt of any information, the set of possible BTSs comprises all BTSs in the country except for the Reference BTS (e.g., the BTS 12). With the PN data received from the measurement BTSs (e.g., the BTSs 14–22), the set of possible BTSs is narrowed to those BTSs in the country that have matching PN offsets and transmit frequencies. However, this is typically an insufficient set of data from which the system 100 can uniquely identify the Measurement BTSs.

To further narrow the set of possible BTSs, the system 100 utilizes the position information regarding the Reference BTS (e.g., the BTS 12 of FIG. 1). For example, if the Reference BTS 12 is located in Seattle, Wash., it is known that the Measurement BTSs 14–22 must be located within that geographic region. The system 100 performs statistical analysis to determine the amount of overlap in coverage areas between known BTSs and a possible Measurement BTS and may also perform relative phase measurements to uniquely identify each measurement BTS. The coverage overlap and relative phase measurement processes are described in greater detail below.

The system 100 generates a large candidate BTS list of all BTSs that match the detected PN offset numbers, BAND_CLASS, and frequency. The candidate list may be stored, by way of example, in the memory 104 (see FIG. 2) if the positioning determining entity is within the mobile unit 10 or within a memory (not shown) in the PDE 26 (see FIG. 1). The system 100 can limit the candidate list to BTSs that are located anywhere near the known coverage area. The known coverage area is based on the Reference BTS. The known coverage area may be further based on any Measurement BTS that has been previously identified by the system. As will be described in greater detail below, the process performed by the system 100 is iterative. That is, when the first Measurement BTS has been uniquely identified, that information may be used to uniquely identify subsequent Measurement BTSs. As more and more Measurement BTSs are identified, it provides further information to the system 100 uses the information from the newly identified Measurement BTS to help identify the remaining Measurement BTSs.

Following the generation of a candidate list, the system 100 selects the most likely candidates. In certain cases, the geographic region analysis described above may be sufficient to uniquely identify one or more of the candidate BTSs as Measurement BTSs. For example, there may be only one candidate BTS having a particular PN offset that is located within the state in which the Reference BTS is located. As previously discussed, the unique identification of a Measurement BTS can be used to provide further data which additional BTSs may be uniquely identified.

In addition, the system 10 select candidates for the Measurement BTSs based on coverage overlap between the known coverage area and the coverage area of possible candidates. In the example of FIG. 1, the Reference BTS 12 has a known coverage area based on data developed at the time of installation of the BTS, such as, by way of example, transmitter power, antenna pattern, and terrain/land-use data. The system 100 calculates a statistical measure of possible overlap in the coverage between the known coverage area and the coverage of a potential candidate Measurement BTS.

Figure 3:
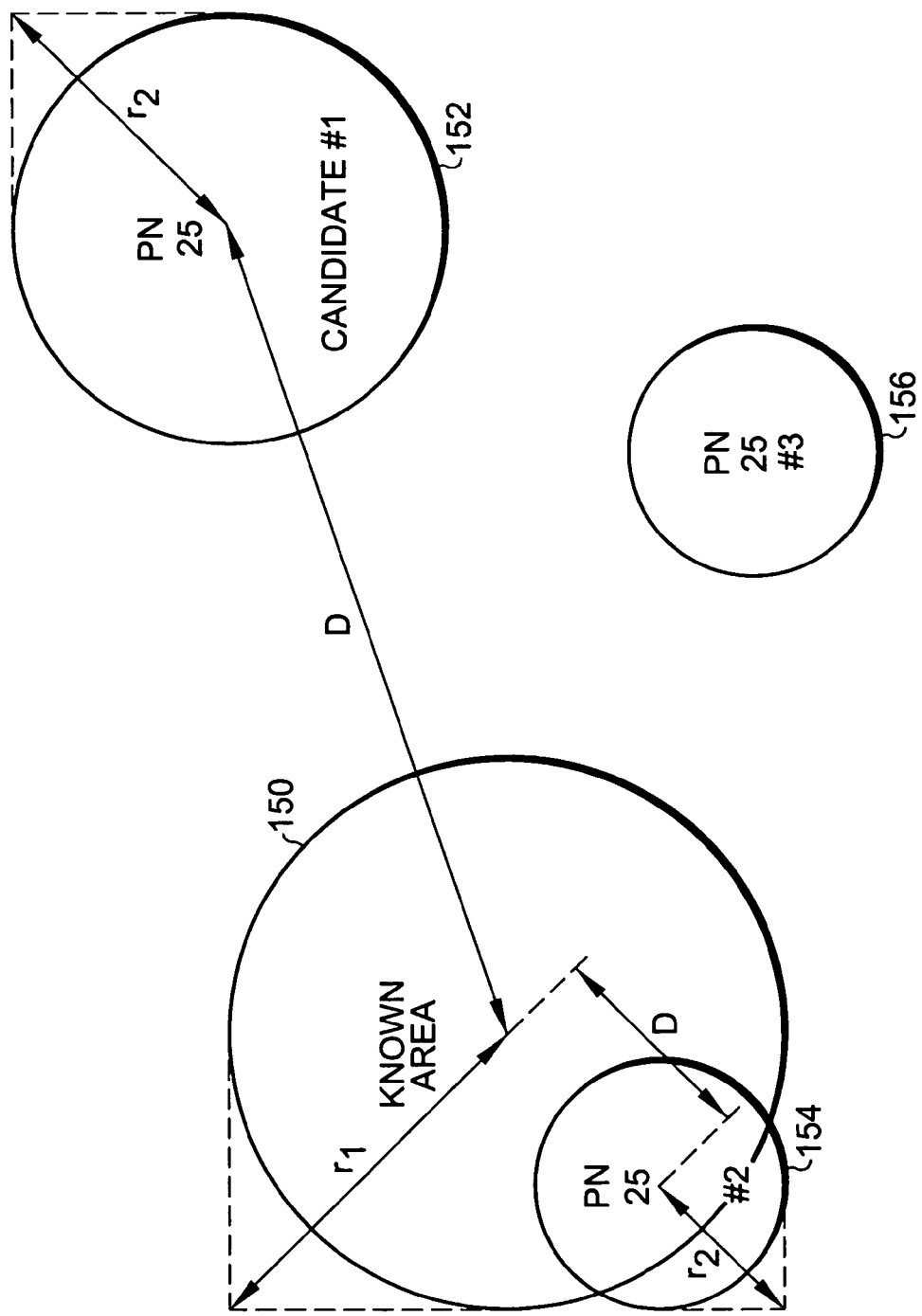
FIG. 3 is a diagram illustrating the identification of candidate BTSs by analyzing cell coverage area overlap.

FIG. 3 provides an example of the operation of the system 100 to analyze coverage area overlap. In the example illustrated in FIG. 3, a known coverage area 150 corresponds to the coverage area of a uniquely identify BTS, such as the Reference BTS (e.g., the BTS 12 of FIG. 1). Using iterative process, described above, the system 100 may use information from any other uniquely identified Measurement BTS (e.g., the BTSs 14–22 of FIG. 1). Thus, the known coverage area 150 described with respect to FIG. 3 may refer to the coverage area of any uniquely identified BTS.

For the sake of convenience, the coverage areas are illustrated in FIG. 3 as circular patterns. Those skilled in the art will recognize that geographic features and/or manmade structures may alter the actual coverage area. The use of circular areas of coverage is not unreasonable and leads to a simplification in the mathematical processes. However, the present invention is not limited to analysis of circular areas only.

The system 100 uses statistical techniques to determine the probability (or likelihood) that the mobile unit is detecting signals from a particular BTS. The system 100 uses the statistical model 122 (see FIG. 2) to determine the probability of coverage area overlap between a known BTS and a candidate BTS and relative phase difference between a known BTS and a candidate BTS. A normal Gaussian distribution (sometimes referred to as a bell-shaped curve) is used to illustrate probabilities with the center or mean of a probability distribution being the peak point in the Gaussian distribution. One standard deviation (sometimes referred to as one-sigma) from the mean results in approximately a 68% probability that a particular measure falls within the Gaussian distribution. A range of two standard deviations (sometimes referred to as two-sigma) results in approximately 95% probability of inclusion within the distribution.

The system 100 calculates probabilities of the mobile unit 10 being within a particular area of coverage. A one-dimensional probabilistic calculation is relatively simple to perform using the Gaussian distribution described above. However, the system 100 must calculate probabilities in two dimensions to accommodate variations in the location of the mobile unit in the North-South direction as well as variations in the East-West direction. To accommodate such two-dimensional probabilities, the system 100 calculates a horizontal estimated position error (HEPE) based on possible errors in two directions. In the example in FIG. 3, the HEPE of the known coverage area 150 is calculated as the square root of the sum of squares of errors in each of the two dimensions. If one assumes a one-sigma (i.e., one standard deviation) from the mean in a Gaussian distribution, the HEPE may be represented by the following:

$$HEPE = \sqrt{\sigma_N^2 + \sigma_E^2} \quad (1)$$

where the $\sigma_N^2$ indicates a one-sigma error in the North-South direction and $\sigma_E^2$ indicates a one-sigma error in the East-West direction. Those skilled in the art will recognize that the HEPE represents the diagonal of a rectangle surrounding the error ellipse. Because the coverage areas are illustrated as circles, the HEPE represents the diagonal of a square.

As illustrated in FIG. 3, the known coverage area 150 has an HEPE distance illustrated as $r_1$, which is based on a one-sigma deviation from the Gaussian mean. Also illustrated in FIG. 3 are three candidate BTSs, each of which has an identical PN offset of 25 (i.e., 25×64 chips). The PN 25 candidates 1 and 3 in FIG. 3 have respective coverage areas 152 and 156 that do not overlap with the known coverage area 150. In contrast, there is overlap between the known coverage area 150 and a candidate coverage area 154 corresponding to the PN 25 candidate 2. The one-sigma distance for the PN 25 candidate 2 is illustrated in FIG. 3 by the value $r_2$. The distances $r_1$ and $r_2$ indicate the relative size of coverage area of the known coverage area 150 and the candidate coverage area 154. The distance from the center of the known coverage area 150 and the center of the candidate coverage area 154 is illustrated in FIG. 3 by the reference D.

The statistical model 122 (see FIG. 2) of the system 100 calculates a measure of coverage overlap using the relative size of coverage areas and the distance D separating the centers of coverage areas. This overlap may be represented by the following:

$$\text{Overlap (in sigmas)} \rightarrow \frac{D}{\sqrt{r_1^2 + r_2^2}} \quad (2)$$

where all terms have been previously defined. A normal distribution statistical evaluation may be made of the term in equation (2) to generate a probabilistic measure of overlap in the known coverage area 150 and the candidate coverage area 154.

The normal distribution density function is sometimes calculated using the following:

$$ND(x) = \frac{1}{2\pi} e^{\frac{-x^2}{2}} \quad (3)$$

where x is the number of standard deviations away from a perfect overlap between the known coverage area 150 and the candidate coverage area 154. For relative probabilities, this equation may be simplified as the following:

$$ND(x) \cong e^{\frac{-x^2}{2}} \quad (4)$$

where all terms have been previously defined.

As an example of the application of the coverage overlap model illustrated above, consider that the distances $r_1$ and $r_2$ in the example of FIG. 3 are 2.0 and 1.0, respectively, while the distance D is 1.1. Note that these distances may be measured in convenient units, such as kilometers or miles. Inserting these values into equation (2) provides a result of 0.49. Substituting that value as x in equation (4) provides a result of 0.886. This indicates an 88.6% probability of perfect overlap between the known coverage area 150 and the candidate coverage are 154. Note that a perfect overlap gives the result of 1.0=100%.

In contrast, the one-sigma size of the coverage area 152 results in a value $r_2$ equal to 1.5 while the distance D between the center of the coverage area 152 and the center of the known coverage 150 is 4.0 units. Applying equation (2) to these values provides a result of 1.6. Substituting that value into equation (4) provides a result of 0.278, which indicates a 27.8% probability of perfect overlap between the known coverage area 150 and the candidate coverage 152. Thus, it can be seen that there is a greater probability (i.e., likelihood) that a candidate BTS identified only as PN 25 would be the PN 25 candidate 2 rather than the PN 25 candidate 1.

The system 100 can eliminate candidate BTSs based solely on the coverage area overlap model. However, those skilled in the art will recognize that there is some probability, however small, that the BTS could be, by way of example, the PN 25 candidate 1 illustrated in FIG. 3. Accordingly, the system 100 will only eliminate a candidate if the probabilities calculated using equation (4) differ by a factor of 10 or other value chosen for relative confidence ratio. That is, a candidate will be eliminated based solely on coverage area overlap only if some other candidate is at least 10 times more likely to be the detected BTS. In the example illustrated above, the PN 25 candidate 2 is slightly more than three times more likely than the PN 25 candidate 1 to be the BTS detected by the mobile unit 10. Therefore, the system 100 will perform additional analysis to uniquely identify the candidate BTS.

Although not described herein, the system 100 would perform a similar analysis with respect to the PN 25 candidate 3. In an exemplary embodiment, the system 100 will analyze any candidate BTS using equation (4) if the result of equation (2) is less than 8. This first step of analysis ensures that even candidates with a very low probability of coverage overlap will be analyzed using equation (4). If the amount of the one-sigma overlap in equation (2) equals 8, the probability using equation (4) is approximately $1.26 \times 10^{-14}$. As a practical matter, the system 100 will eliminate any candidate whose one-sigma overlap has such a large value. This may typically occur in a situation where great distances separate the candidate coverage area from the known coverage area. For example, if the known coverage area 150 is in Seattle, Wash. and a candidate BTS is in San Francisco, Calif., the distance D separating the two BTSs is so large that the probability of reception from the San Francisco BTS can be ignored.

The system 100 would also check that the probability of the most-like candidate is reasonable. If the probability of the most likely candidate is, by way of example, 0.001, (i.e., 0.1%), this suggests a fairly poor fit of the candidate BTS and other known information, and the possibility that the correct BTS is not in the original BTS database may be higher. The system 100 will verify that the fit of the best candidate is at least 0.01 (i.e., 1%) or other value chosen for minimum likelihood threshold, to reduce the change of matching a measurement with a potentially incorrect BTS.

In addition to a coverage area overlap analysis described above, the system 100 uses a relative phase model to further narrow the list of candidate BTSs. The term "relative phase" is used to indicate the distance from the candidate BTS to the mobile unit 10. As discussed above, each BTS transmits an identical PN sequence, but with known time delays or PN offsets. When two candidate BTSs have an identical PN offset, the signal will be detected by the mobile unit 10 (see FIG. 1) at different times (or phase offsets) based on the distance from the candidate BTS to the mobile unit. In the example of FIG. 1, the mobile unit 10 is known to be within the coverage region of the Reference BTS 12. If two candidate Measurement BTSs are also within that coverage region, it may be possible to eliminate one of the candidate BTSs based on the propagation delay, which is indicative of the relative phase. For example, if one candidate BTS is within two miles of the Reference BTS while the other candidate BTS is twenty miles from the Reference BTS, the relative phase between the two can be used to eliminate one of the candidate BTSs.

In an exemplary embodiment, the statistical model 122 (see FIG. 2) uses a double-difference relative phase model as follows:

$$ND([(d_K-d_i)-(p_K-p_i)]/S_C) \qquad (5)$$

where $d_K$ is the distance from the center of the combined coverage area (i.e., the combined coverage area of the candidate BTS and the known BTS) to an already known BTS, $d_i$ is the distance from the combined coverage area center to the candidate BTS, $p_K$ is the phase measurement to the known BTS, $p_i$ is the phase measurement to the candidate BTS, and $S_C$ is the size of the expected double-difference phase error based on the combined coverage area. The term "double difference" refers to a statistical calculation based on two difference measurements (i.e., the difference in distance minus the difference in phase).

The phases $p_K$ and $p_i$ are adjusted for known BTS biases such as forward link hardware delay. As those skilled in the art will appreciate, hardware delays may occur due to processing within circuitry, filters, connector cables, and the like. Uncertainties in the phase measurements due to BTS bias uncertainty, and possible propagation delays and measurement errors are combined with the denominator ($S_C$) of the relative phase test. Additionally, the relative phase test can be removed, given far less weight, or made one-sided if either the known BTS or the candidate BTS has a repeater which can significantly delay the relative phase measurement. For measurement purposes, the phase of a signal that goes through a repeater (e.g., the repeater 30 of FIG. 1) is delayed and appears further away than a signal coming from a donor BTS (e.g., the BTS 18). Compared to the normal direct signal, the repeater signal is delayed by both hardware delay, due to filters, cables, and the like, and is further delayed because the signal path from the donor BTS may be indirect, resulting in additional delay.

The relative phase test may be modified for the presence of repeaters in two different ways. In one case, the location and signal delays of all repeaters are known. In the second case, it is known that a given BTS may have one or more signal repeaters, but the location and/or signal delays of these repeaters are not known. In the first case, certain BTSs (e.g., the BTS 18 of FIG. 1) are known to have one or more repeaters (e.g., the repeaters 30 and 34), and the location and signal delays of each of the repeaters is known. In this case, each repeater of each BTS can be treated as another candidate BTS. The candidate repeater looks similar to the donor BTS except that it is in a different location with a different, usually much higher hardware delay. Further, each candidate repeater has a different sector center and maximum antenna range. The candidate repeater is added to the candidate list in the same way as a normal BTS only subject to the same coverage area and phase tests as any other candidate. Assuming such repeater information is available, this is the preferred method of treating a repeater because it increases the likelihood that both the donor BTS and each repeater can be used as the signal original of measurement.

In the second case, a BTS, such as the BTS 18 of FIG. 1, may have one or more repeaters (e.g., the repeaters 30 and 34), but the location and signal delays of the repeaters is not known. If a signal comes from a repeater, it is delayed longer than a phase delay coming directly from the donor BTS. As a result, the relative phase test described above needs to allow for a phase that is equal to, or longer than, a signal that came directly from the donor BTS. In the case where a candidate BTS may have a repeater, the relative phase test is modified so that the double-difference is consistent with a much longer than expected phase delay from that candidate BTS. For example, the relative probability is not scored based on the approximation of Equation (4), but is instead equal to the maximum value of Equation (4) or 0.5, which ensures that a long phase delay never has a score worse than 0.5. This effectively makes the phase test one-sided. One skilled in the art will recognize that other techniques may be used to compensate for long phase delays that may be introduced by repeaters. Additionally, when selecting a comparison BTS for relative phase delay test measurements, it may be useful to avoid a comparison with a BTS with repeaters.

The combined coverage area is a probabilistic measure of the combined areas of coverage of the known BTS and the candidate BTS. Details on the measurement of the combined coverage area are provided below. The relative phase model is used to determine whether the phase delay measured by the mobile unit 10 (see FIG. 1) is consistent with the distances between the known BTS and the candidate BTS. As discussed above, the known BTS may be the reference BTS (e.g., the BTS 12 of FIG. 1) or any other measurement BTS that has already been uniquely identified.

The example presented above is one technique that may be used to determine such relative phase differences. Those skilled in the art will recognize that other techniques may be used to determine such phase differences. The present invention is not limited by the specific analysis described above to determine the relative phase differences.

Figure 4:
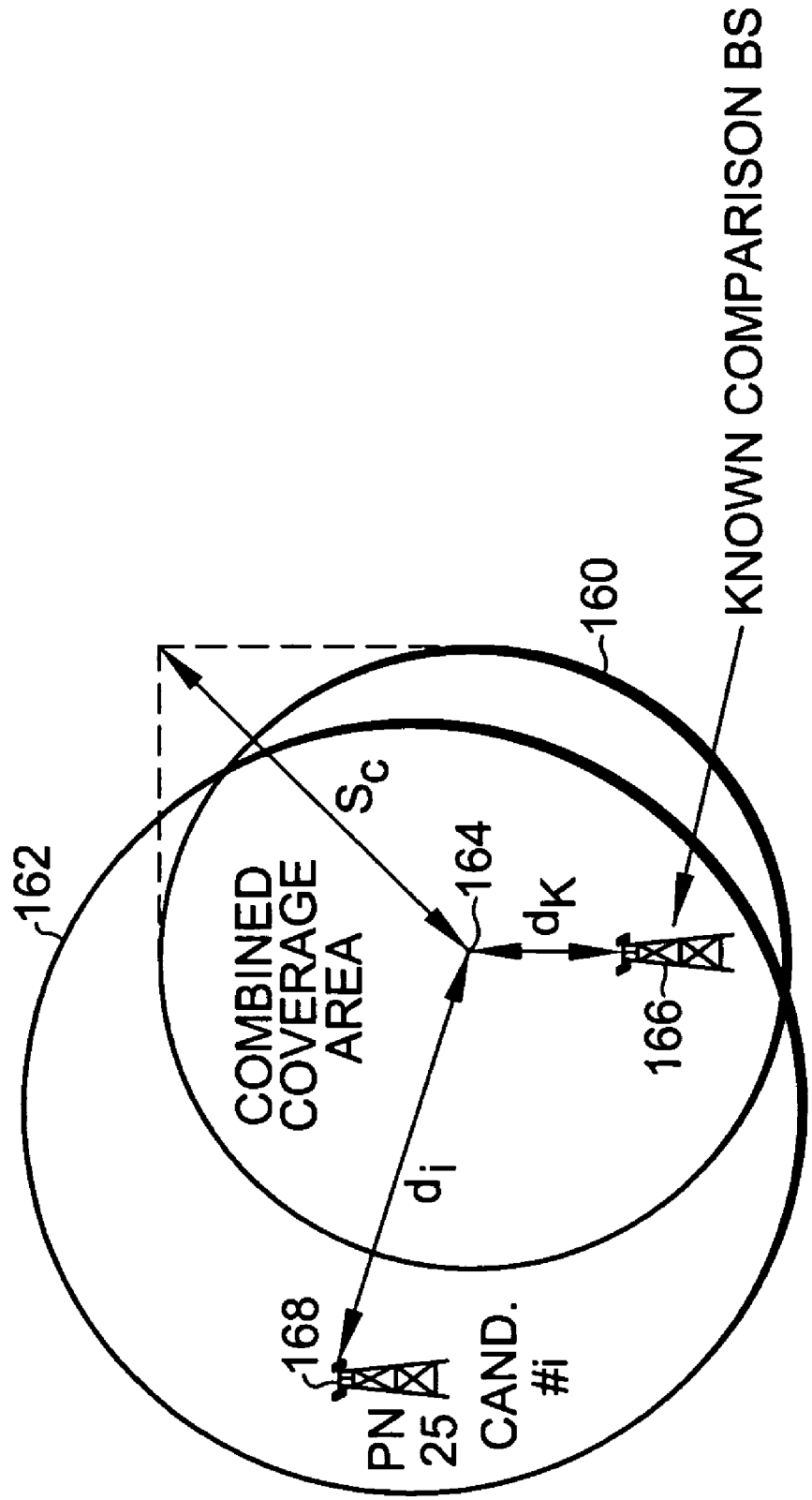
FIG. 4 is a diagram illustrating the identification of candidate BTSs by analyzing relative phase delays of the candidate BTSs.

The calculation of the relative phase is illustrated in FIG. 4 where the approximate center of a combined coverage area 160 is indicated by the reference numeral 164. The distance $d_K$ is the distance between the center 164 of the combined coverage area 160 and a known BTS 166. As discussed above, the known BTS 166 may be the Reference BTS, Serving BTS, or a uniquely identified Measurement BTS.

A candidate BTS 168 has a coverage area 162, which is modeled as a circular coverage area. As shown in FIG. 4, the candidate BTS 168 is not located at the center of the candidate coverage area 162. This is due to the fact that a typical BTS is not omni-directional, but is broken up into a number of sectors. The sector could be modeled by the system 100 as a pie-shaped sector. However, such modeling is often inaccurate due to back scatter from the antenna, as well as reflection off buildings, natural terrain, and other objects. Thus, the candidate coverage area 162 may be modeled as a circle. Similarly, the known BTS 166 is typically not located at the center of the known coverage area (not shown in FIG. 4) for the reasons discussed above.

The coverage areas of each BTS (or each cell sector) is determined at the time of installation and is known. The combined coverage area, indicating the coverage area of the known BTS 166 and the candidate BTS 168, can be calculated linearly by calculating an area of overlap of circular areas of coverage. Alternatively, the combined coverage area may be calculated weighting the coverage areas. The determination of the combined coverage area is described in greater detail below.

The combined coverage area 160 is determined based on coverage areas mapped when a BTS is installed and calibrated. The combined coverage area 160 is a probabilistic estimation of coverage areas of the known BTS 166 and the candidate BTS 168. As discussed above, the two-dimensional positional error, referred to as HEPE provides a measure of the statistical uncertainty in measuring the combined coverage area 160. In the system 100, a distance $S_C$ is based on HEPE coverage and represents a one-sigma uncertainty in the relative phase.

The distance between the center 164 of the combined coverage area 160 to the candidate BTS 168 is indicated by $d_i$. Phase measurements $p_K$ and $p_i$ are measured by the mobile unit 10 and provided to the PDE (e.g., the PDE 26 of FIG. 1) through the BTS using telecommunication standard TIA-801.

As noted above, the system 100 can calculate the expected relative phase difference and compare the expected phase difference with actual distance measurements. The system 100 may apply the normal distribution equation (4) to calculate the probability that the candidate BTS is consistent with the phase and distance measurements. If multiple candidate BTSs (with the same PN) are detected by the system 100, it may be possible to eliminate one or more the candidate BTSs based on the relative phase difference. That is, the candidate BTS must have a phase difference that is reasonable given the location of the known BTS from the center 164 of the combined coverage area 160 to the distance from the candidate BTS from the center of the combined coverage area. Candidate BTSs that are inconsistent can be eliminated from the candidate list.

The relative phase model is applied to other candidate BTSs as well. For example, FIG. 3 illustrates three candidates that all have the identical PN 25 offset. The analysis process described above is applied to each of the candidate BTSs (e.g., the PN 25 candidates 1–3 of FIG. 3) with a probability calculated for each candidate BTS. As noted above, a candidate BTS may be eliminated based solely on the coverage area overlap model if the coverage overlap of another BTS is at least 10 times more likely than the coverage area overlap of the BTS to be eliminated. Similarly, a particular candidate BTS may be eliminated based solely on the relative phase model if the phase difference probability of another BTS is at least 10 times more likely than the phase difference probability of the BTS to be eliminated. This process assures that a low probability candidate BTS will be eliminated with little likelihood of eliminating the wrong BTS.

The probabilities of the coverage area overlap model and the relative phase model may be combined to eliminate candidate BTSs. In one example, the probability of the coverage area overlap model is multiplied by the probability of the relative phase model. The combination of probabilities serves to further eliminate unlikely BTSs from the candidate list.

Figure 5B:
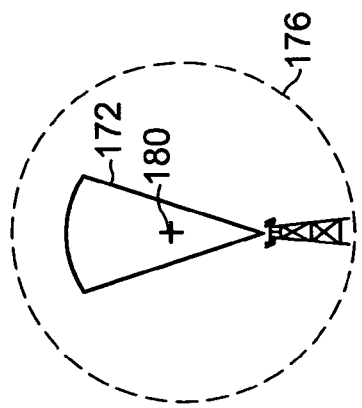
FIGS. 5A–5D are diagrams illustrating cell sector coverage of a typical BTS and coverage modeling by the present invention.
Figure 5D:
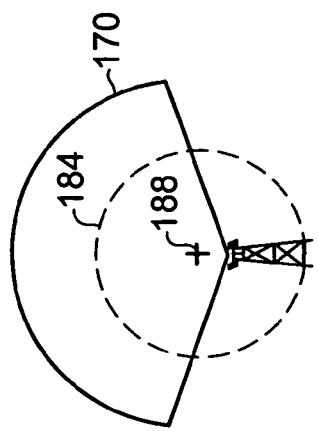
Figure 5A:
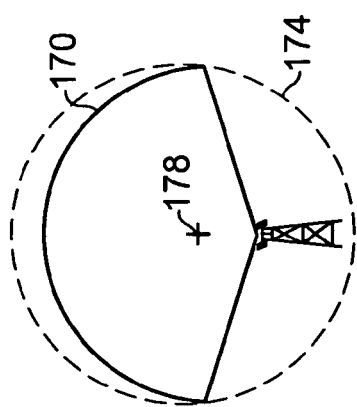
Figure 5C:
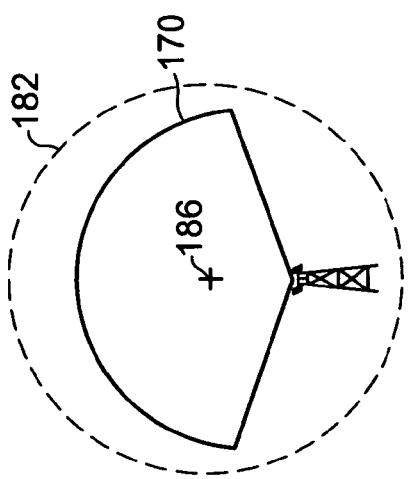

In addition to the analysis described above, the system 100 may also use signal strength and models of the cell sector coverage to uniquely identify candidate BTSs. As discussed above, a typical BTS has multiple transmitters and multiple antenna elements, each of which is directed for operation in a sector. In a typical embodiment, a BTS may have three sectors, each of which may be considered a separate BTS. The area of coverage of a typical sector may have a pie-shaped area of coverage, such as illustrated in FIGS. 5A–5D. The coverage area of a sector is generally determined by measurement at the time a BTS is installed. The coverage area is based on factors such as maximum antenna range, maximum transmitter power, and the like. In some installations, a BTS is divided into three sectors with a wide coverage area 170, such as illustrated in FIGS. 5A, 5C and 5D. In other installations, it is desirable to have a more narrow sector, such as a coverage area 172 illustrated in FIG. 5B.

The system 100 can model the coverage area as the pie-shaped coverage areas 170 and 172. However, it is convenient to model the coverage areas as essentially circular distributions. As discussed above, factors such as antenna backscatter and reflections from man-made objects, terrain, and the like result in a coverage area pattern that may be more circular in shape than pie-shaped. Accordingly, in an exemplary embodiment, the system 100 models the coverage area 170 in FIG. 5A as a circular coverage area 174 while the coverage area 172 in FIG. 5B is modeled as a circular coverage area 176. The coverage areas 170 and 172 are calculated at the time of installation of the BTS and provide a 99% probability of coverage within that area. The circular coverage areas 174, 176, 182 and 184 indicate the area where there is a 99% probability that the mobile unit is within the circle. The center of the coverage areas 174 and 176 are represented by reference numerals 178 and 180, respectively. In an exemplary embodiment, the system 100 uses the circular model coverage areas 174 and 176, it is possible to calculate the combined coverage area 160 (see FIG. 4).

As previously discussed, the coverage areas 174 and 176 are used in the probabilistic calculations for relative phase measurement. The combined coverage areas may be linearly combined or weighted based on a scale factor. The system 100 may calculate scale factors based on received signal strength. One measure of received signal strength is $E_c/I_o$, which is a measure of the pilot energy accumulated over a 1 PN chip period (i.e., $E_c$) to the total power spectral density (i.e., $I_o$) in the received bandwidth. Those skilled in the art will recognize that other power measurements may also be used satisfactorily with the system 100. Based on the signal strength, the system 100 assigns a scale factor based on the strength or weakness of the received signal. The concept of scale factoring is illustrated in FIGS. 5C and 5D. In FIG. 5C, the received signal strength is relatively weak. Thus, the mobile unit may be located within a relatively wide area with respect to the BTS. In this event, the circular coverage area 174 may be expanded by a scale factor to produce a larger circular coverage area 182, illustrated in FIG. 5C. This wider circular coverage area 182 reflects the fact that the mobile unit 10 may be located anywhere within the wider range. The center of the circular coverage area 182 is indicated by the reference numeral 186.

In contrast, the system 100 may reduce the coverage area if the received signal strength is strong. This indicates that the mobile unit is more likely close to the BTS rather than farther away. This probability is illustrated in FIG. 5D where a reduced circular area of coverage 184 is smaller in diameter than the circular coverage area 170. The reduced circular coverage area 184 reflects the fact that there is an increased probability that the mobile unit 10 is quite close to the BTS based on the signal strength. The center of the circular coverage area 184 is indicated by the reference 188.

In an exemplary embodiment, the system may apply a scale factor of 0.9 for a strong signal, above a self-preselected threshold, and may apply a scale factor of 1.1 for weak signals (below a predetermined threshold).

As previously discussed, the coverage area calculations are used to establish the combined coverage area (e.g., the combined coverage area 160 of FIG. 4). The cell sector models illustrated in FIGS. 5A–5D may also be used to calculate the known area (e.g., the known area 150 of FIG. 3). In a simple calculation, the coverage area of a single known BTS may be used as the known area for the coverage area overlap model. Similarly, a single known BTS may be used in combination with a single candidate BTS to generate the combined coverage area used in the relative phase model. However, the system 100 can also accommodate calculations of the known area or combined coverage area that may result from mixing coverage areas from multiple cells. The cells may be combined in a linear fashion or may include weighting, such as the scale factors applied in FIGS. 5C and 5D or the inverse of the size of each coverage area.

Figure 6:
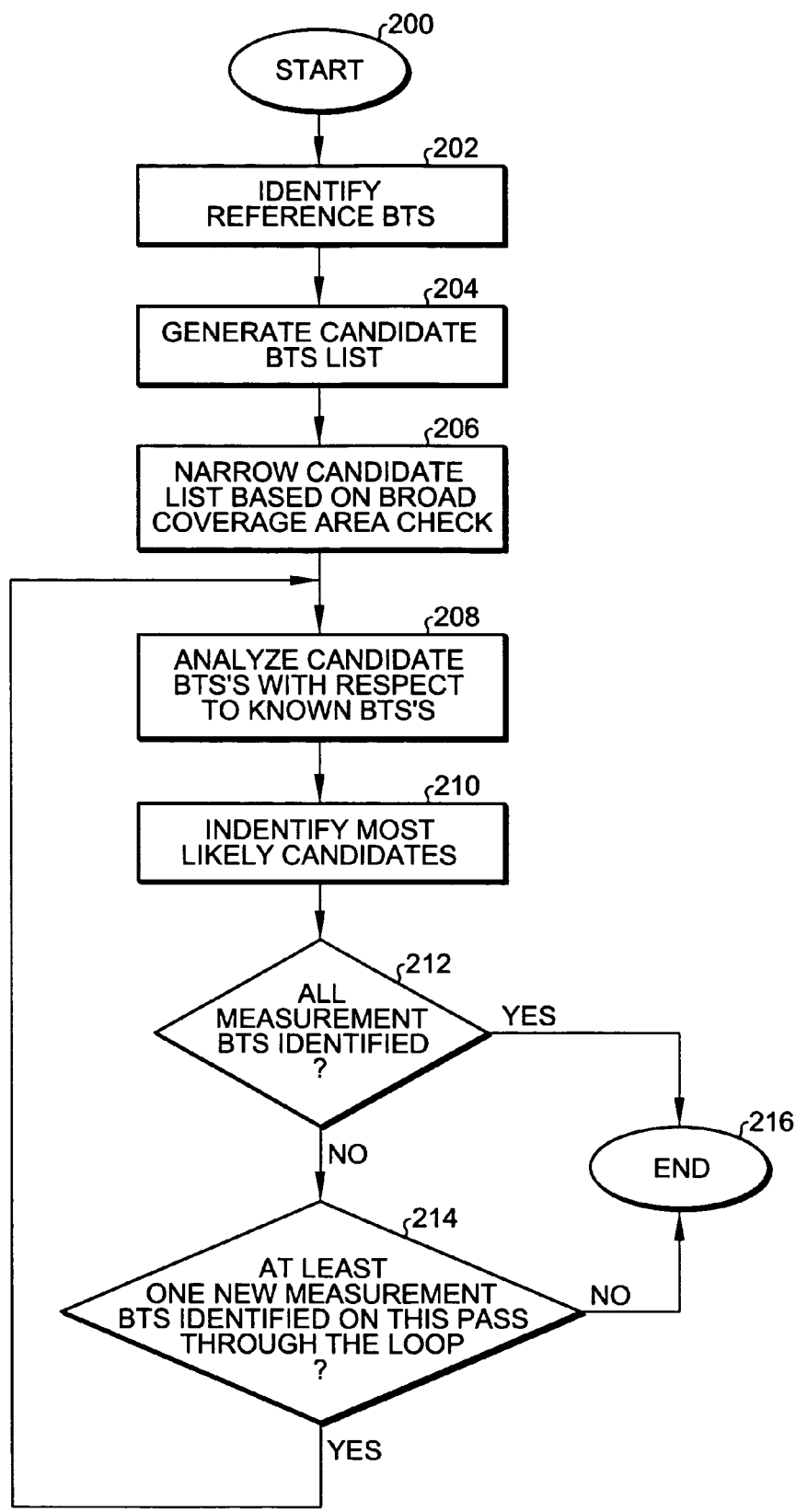
FIG. 6 is a flowchart illustrating the operation of the present invention.

The identification process of the system 100 is illustrated in the flow chart of FIG. 6 where, at a start 200, the mobile unit 10 is under power and a request for location determination has been made. In step 202, system 100 identifies the Reference BTS (e.g., the BTS 12 in FIG. 1). As noted above, the Serving BTS is the BTS with which the mobile unit 10 initially communicated. In some cases a hand-off may have occurred such that the mobile unit 10 is now communicating with a different BTS. The hand-off process is well known in the art and need not be described herein. For the sake of the understanding of the present invention, it is sufficient to state that the mobile unit 10 is in communication with the Reference BTS, which may or may not be the Serving BTS, and has uniquely identified the Reference BTS.

In step 204, the system 100 generates a candidate list. As previously discussed, signals received from various Measurement BTSs are typically identified only with the respective PN offsets for the Measurement BTSs. Based on the PN offset, a number of candidate BTSs may be identified. In exampled discussed herein, a PN offset of 25 (i.e., 25×64 chips) was identified as a Measurement BTS. In the example described herein, a number of candidate BTSs throughout the country may have an identical PN 25 offset. Each of these candidate BTSs is entered into the candidate list in step 204.

In step 206, the system 100 narrows the candidate list based on a comparison of coverage areas. As previously discussed, this analysis includes the elimination of BTSs whose geographic location makes it unlikely that the particular BTS has been detected by the system 100. For example, if the mobile unit 10 has been identified as being located somewhere in the Seattle region based on the communication link 24 with the Reference BTS 12 (see FIG. 1), it is possible to eliminate BTSs in regions remote from the Seattle area.

As indicated above, the analysis may be performed by the PDE 26 (see FIG. 1), which may be part of a BTS, remote from the BTS, or may be performed within the mobile unit 10. The system 100 may initially identify the Reference BTS and, may typically uniquely identify one or more Measurement BTSs using the processes described above in step 206. Namely, the system 100 may eliminate candidate BTSs that are not in the same geographic region as the reference BTS. Alternatively, there may be a circumstance in which a particular geographic region has only one BTS with a particular PN offset. In those circumstances, there is no ambiguity as to the unique identity of the candidate BTS. The system 100 will identify that candidate BTS as a Measurement BTS.

In step 210 the system 100 uses analytical techniques, such as coverage area overlap and relative phase difference to further identify candidate BTSs. Furthermore, the system 100 may use signal strength and an analysis of mixed cell sector positioning to identify the candidate BTSs. In step 210, the system 100 identified the most likely candidates based on the analysis in step 208. As discussed above, the most likely candidate may be selected on the basis of one or more analytical techniques. These analyses, such as coverage overlap and relative phase measurement may be performed individually or the probabilities may be combined to identify the most likely candidates.

In decision 212, the system 100 determines if all Measurement BTSs have been identified. If candidate BTSs remain unidentified, the result of decision 212 is NO and the system 100 moves to decision 214. As previously noted, the process of identifying measurement BTSs utilizes knowledge gained from the previous identification of other measurement BTSs in an iterative process. Accordingly, FIG. 6 illustrates a processing loop formed by steps 208 and 210 as well as decisions 212 and 214. In decision 214, the system 100 determines whether at least one new measurement BTS has been identified in this iteration through the loop. Assuming the system 100 is successful in identifying measurement BTSs, the result of decision 214 is YES and the process returns to step 208 to analyze candidate BTSs with respect to known BTSs, including the at least one new measurement BTS that was identified on the previous pass through the loop. The process ends when either all measurement BTSs have been identified by the system or when no new BTSs can be identified. If all measurement BTSs have been identified, the result of decision 212 is YES and the process ends at 216. If BTSs remain unidentified, but the system 100 is unable to identify additional BTSs based on the information available, the result decision 214 is NO and the process ends at 216.

Using the principles of the present invention, it is possible to identify all Measurement BTSs detected by the mobile unit 10 (see FIG. 1). As those skilled in the art can appreciate, location determination is more accurate with more Measurement BTSs. If a candidate BTS cannot be uniquely identified, it is unreliable for AFLT purposes. However, using the techniques of the present invention, it is possible to identify many of those additional Measurement BTSs and thereby provide additional sources of measurements that can be used to more reliably determine the location of the mobile unit 10.

In the example provided above, the identification process is conducted by the mobile unit 10. However, the identification of candidate BTSs may be performed by other entities, such as the PDE 26 (see FIG. 1). For example, Communication Standard TIA-801 already provides for transmission of relative phase measurements from the mobile unit to the PDE 26. Additional information, such as precise locations of the BTSs, coverage areas, and the like are also readily determined by any entity, such as the mobile unit 10, a BTS or the PDE. Given this information, any position determining entity may perform the necessary calculations to uniquely identify each measurement BTS. Accordingly, the present invention is not limited to identification of candidate BTSs based solely on analysis by the mobile unit 10.

It is to be understood that even though various embodiments and advantages of the present invention have been set forth in the foregoing description, the above disclosure is illustrative only, and changes may be made in detail, yet remain without the broad principles of the invention. Therefore, the present invention is to be limited only by the appended claims.

The invention claimed is:

1. In operating a mobile communications unit in a wireless communication system, a method for distinguishing a base station having partial identification data from another base station having the same partial identification data, comprising:
   uniquely identifying a first base station;
   receiving transmissions from at least one additional base station, the transmissions containing only the partial identification data;
   generating a candidate list providing identification of candidate base stations having the same partial identification data;
   analyzing the candidate base stations on the candidate list with respect to identification data of the first base station; and
   uniquely identifying a candidate base station based on the analysis of the candidate base stations.

2. The method of claim 1 wherein the first base station is a serving base station with which the wireless device has initially established a communications link.

3. The method of claim 1 wherein said generating a candidate list providing identification of candidate base stations includes including at least one candidate base station that is out of communication range of said first base station.

4. The method of claim 1 wherein said analyzing the candidate base stations is iteratively performed with respect to other ones of the candidate base stations that have been previously uniquely identified.

5. The method of claim 1 wherein said analyzing the candidate base stations comprises analytically determining an area of coverage overlap between a known coverage area of the first base station and a coverage area of a selected one of the candidate base stations.

6. The method of claim 5 wherein said determining the area of coverage overlap includes generating a probabilistic result and wherein said uniquely identifying the candidate base station is based on the probabilistic result.

7. The method of claim 5 wherein said determining the area of coverage overlap further comprises altering a coverage area model for a selected candidate base station based on a received signal strength of a signal received from the selected candidate base station.

8. The method of claim 1 wherein said analyzing the candidate base stations comprises determining a probability that an area of coverage of each of the candidate base stations overlaps an area of coverage for the first base station.

9. The method of claim 8 further comprising deleting a selected candidate base station from the candidate list if the selected candidate base station has a probability of coverage overlap that is less than a probability of coverage overlap of another candidate base station by a predetermined amount.

10. The method of claim 9 wherein said predetermined amount is greater than 10 times.

11. The method of claim 1 wherein said analyzing the candidate base stations comprises analytically determining a relative phase delay between the first base station and a selected candidate base station.

12. The method of claim 11 wherein said determining the relative phase delay comprises generating a probabilistic result and said uniquely identifying the base station comprises basing the identity on the probabilistic result.

13. The method of claim 11 further comprising adjusting the relative phase delay to account for any repeater in the system.

14. The method of claim 11 wherein at least one of the candidate base stations includes a repeater having a known location and signal processing delay, the method further comprising adding the repeater to the candidate list as a candidate base station.

15. The method of claim 11 wherein said analyzing the candidate base stations comprises determining a probability that a phase delay of each of the candidate base stations relative to a phase delay for the first base station corresponds to a distance from each of the candidate base stations to a predetermined location relative to a distance from the first base station to the predetermined location.

16. The method of claim 14 wherein the predetermined location for each of the candidate base stations is an approximate center of an area of combined coverage of each of the respective candidate base stations and the first base station.

17. The method of claim 16 wherein determining the relative phase delay further comprises altering the combined coverage area for a selected base station based on a received signal strength of a signal received from the selected base station.

18. The method of claim 15 further comprising deleting a selected candidate base station from the candidate list if the probability of the relative phase delay corresponding to the relative distance for the selected candidate base station is less than the probability of the relative phase delay corresponding to the relative distance for other candidate base stations by a predetermined amount.

19. The method of claim 18 wherein said predetermined amount is greater than 10 times.

* * * * *